US007809001B2

(12) United States Patent
Yamakawa

(10) Patent No.: US 7,809,001 B2
(45) Date of Patent: Oct. 5, 2010

(54) OPENED NETWORK CONNECTION CONTROL METHOD, OPENED NETWORK CONNECTION CONTROL SYSTEM, CONNECTION CONTROL UNIT AND RECORDING MEDIUM

(75) Inventor: Kazuo Yamakawa, Takamatsu (JP)

(73) Assignee: Fujitsu Limited, Kawasaki (JP)

( * ) Notice: Subject to any disclaimer, the term of this patent is extended or adjusted under 35 U.S.C. 154(b) by 1119 days.

(21) Appl. No.: 11/024,493

(22) Filed: Dec. 30, 2004

(65) Prior Publication Data
US 2006/0018264 A1 Jan. 26, 2006

(30) Foreign Application Priority Data
Jul. 21, 2004 (JP) .............................. 2004-213522

(51) Int. Cl.
*H04J 3/16* (2006.01)
(52) U.S. Cl. ................. 370/395.1; 370/305.2; 370/395; 370/398; 370/401; 370/385; 379/202; 379/229; 379/230
(58) Field of Classification Search ............... 370/395.1, 370/305.2, 395, 398, 401, 381–385, 399, 370/422; 379/202, 229, 230
See application file for complete search history.

(56) References Cited

U.S. PATENT DOCUMENTS

| | | | | |
|---|---|---|---|---|
| 5,434,852 | A * | 7/1995 | La Porta et al. | ............. 370/385 |
| 6,487,557 | B1 * | 11/2002 | Nagatomo | .................. 707/102 |
| 6,636,513 | B1 * | 10/2003 | Nishikawa et al. | ....... 370/395.1 |
| 6,658,579 | B1 * | 12/2003 | Bell et al. | .................... 713/400 |
| 6,944,555 | B2 * | 9/2005 | Blackett et al. | ............... 702/62 |
| 7,027,808 | B2 * | 4/2006 | Wesby | ......................... 455/419 |
| 7,039,720 | B2 * | 5/2006 | Alfieri et al. | ................. 709/242 |
| 7,051,098 | B2 * | 5/2006 | Masters et al. | .............. 709/224 |
| 7,088,720 | B1 * | 8/2006 | Schneider et al. | ......... 370/395.1 |
| 7,295,566 | B1 * | 11/2007 | Chiu et al. | ................... 370/419 |
| 7,310,356 | B2 * | 12/2007 | Abdo et al. | ................. 370/522 |

(Continued)

FOREIGN PATENT DOCUMENTS

| | | |
|---|---|---|
| JP | 2002-366525 | 12/2002 |
| JP | 2004-94290 | 3/2004 |

OTHER PUBLICATIONS

Cisco Network Admission Control; printed on Oct. 2, 2009 from www.cisco.com/en/US/netsol/ns466/networking_solutions_package.html; 2 pages and from www.cisco.com/en/US/solutions/collateral/ns340/ns394/ns171/ns466/at_a_glance_c45-542749.pdf; 2 pages.

(Continued)

*Primary Examiner*—Ayaz R Sheikh
*Assistant Examiner*—Andrew C Lee
(74) *Attorney, Agent, or Firm*—Staas & Halsey LLP

(57) ABSTRACT

Disclosed are an opened network connection control method, an opened network connection control system, a connection control unit and a recording medium, which allow only terminal units capable of securing security to be connected to an opened network, thereby improving the security level. The connection control unit acquires connection history information held by the terminal unit which has sent a request for connection to the opened network to a central unit, and assigns a logic identifier to the terminal unit and connects the terminal unit to the opened network when the contents of the acquired connection history information coincide with the contents of connection condition information record.

35 Claims, 16 Drawing Sheets

U.S. PATENT DOCUMENTS

| | | |
|---|---|---|
| 7,428,512 B2 * | 9/2008 | Nozaki et al. .................. 705/57 |
| 2001/0044894 A1 * | 11/2001 | Saito et al. .................. 713/156 |
| 2001/0050914 A1 * | 12/2001 | Akahane et al. ............. 370/382 |
| 2002/0036800 A1 * | 3/2002 | Nozaki et al. .............. 358/1.15 |
| 2003/0055994 A1 | 3/2003 | Herrmann et al. |
| 2004/0243454 A1 * | 12/2004 | Yoshida ........................ 705/7 |

OTHER PUBLICATIONS

Symantec Network Access Control; printed on Oct. 2, 2009 from www.symantec.com/business/network-access-control; pp. 1-6 & 2 additional pages.

Systemwalker Desktop Inspection; printed on Oct. 2, 2009 from systemwalker.fujitsu.com/jp/desktop_inspection/; 2 pages.

* cited by examiner

FIG. 2

CONNECTION-CONDITION INFORMATION DATABASE ~351

| KEYWORD | UPDATE NUMBER | URL |
|---|---|---|
| Windows Update | A0001 | http://www.xx○○.△△.xx |
| | A0002 | http://www.xx○○.△△.x○ |
| | ... | ... |
| Browser | B0001 | http://www.○○△.x△.○○ |
| | B0002 | http://www.○○△.x△.xx |
| | ... | ... |
| Virus | xx/○○/2004rev.x○ | http://www.x△x.○○.○x |
| | △△/x○/2004rev.△△ | http://www.x△x.○○.○○ |

FIG. 3

TEMPORARY-IP-ADDRESS INFORMATION DATABASE ~352

| PARAMETER | SET VALUE |
|---|---|
| SUB NET | 192.168.0.0 |
| SUB-NET MASK | 255.255.255.0 |
| RANGE OF TEMPORARY IP ADDRESSES | 192.168.0.21~192.168.0.100 |
| ... | ... |

FIG. 4

TEMPORARY IP ASSIGNMENT DATABASE — 353

| TERMINAL UNIT ID | TEMPORARY IP ADDRESS | STATUS |
|---|---|---|
| 0001 | 192.168.0.21 | ASSIGNED |
| 0002 | 0.0.0.0 | NOT ASSIGNED |
| ... | ... | ... |
| 0010 | 192.168.0.22 | ASSIGNED |
| ... | ... | ... |

FIG. 5

UPDATE INFORMATION DATABASE 354

| UPDATE NUMBER | UPDATE INFORMATION |
|---|---|
| A0001 | X0001.△△△ |
| ⋮ | ⋮ |
| B0001 | Y0001.△×× |
| ⋮ | ⋮ |
| ××/○○/2004rev.×○ | Z0001.○×○ |
| ⋮ | ⋮ |

FIG. 12

| TERMINAL UNIT ID | CONNECTION HISTORY INFORMATION ~355 | | | | DATE |
| --- | --- | --- | --- | --- | --- |
| | Windows Update | Browser | Virus | | |
| 0001 | A0002 | B0002 | xx/xx/2004.rev.xx | | xx/○○/2004 |
| 0002 | A0002 | B0001 | ○○/xx/2004.rev.○○ | | ○○/△△/2004 |
| ... | ... | ... | ... | | ... |

OPENED NETWORK CONNECTION CONTROL METHOD, OPENED NETWORK CONNECTION CONTROL SYSTEM, CONNECTION CONTROL UNIT AND RECORDING MEDIUM

CROSS-REFERENCE TO RELATED APPLICATIONS

This Nonprovisional application claims priority under 35 U.S.C. §119(a) on Patent Application No. 2004-213522 filed in Japan on Jul. 21, 2004, the entire contents of which are hereby incorporated by reference.

BACKGROUND OF THE INVENTION

The present invention relates to an opened network connection control method, an opened network connection control system, and connection control unit, which control connection of terminal units to an opened network on the basis of information on security, and a recording medium storing a computer program which achieves the connection control unit.

The development of networks typified by the Internet permits acquisition of multifarious kinds of information stored on Web servers connected to an opened network, e.g., the Internet, as a plurality of terminal units (e.g., personal computers) connected to a closed network in an organization, such as a company or an association, e.g., a LAN, are connected to the Internet.

When terminal units connected to a closed network are connected to the Internet, a DHCP (Dynamic Host Configuration Protocol) server provided in the closed network assigns a local IP address (local network address) to each terminal unit. Accordingly, each of the terminal unit can connect to a predetermined Web server via the Internet without identifying a global IP address and acquire various kinds of information.

Meantime, as terminal units connected to a closed network are connected to the Internet, there is a growing risk in the terminal units connected to the closed network, a DHCP server and the like would be damaged by viruses intruding the closed network via the Internet or illegitimate use by a malignant third party. In this respect, companies, associations and the like often set security policies for the use of the Internet, and determine connection conditions, use conditions, etc. based on the security policies as internal rules.

For example, the website of Willy International, Ltd. discloses software for management of Web resources, which performs access control (access permission, access rejection) on accesses to a dispersed environment for each user group, and can secure security at the time of accessing via the Internet for each company portal or each department portal.

BRIEF SUMMARY OF THE INVENTION

The present invention has been made in view of the above situation, and aims at providing an opened network connection control method, and an opened network connection control system, which are provided with a connection control unit that compares connection history information of terminal units in a closed network with connection condition information necessary for ensuring security, determines whether the connection history information fulfills the connection condition information or not, and controls connection of the terminal units, in case where the terminal units in the closed network are connected to an opened network, such as the Internet, and can prevent the terminal units from being unconditionally connected to an opened network and allow only those terminal units capable of keeping a predetermined security level to be connected to an opened network, thereby keeping the security level of the closed network, and also providing the connection control unit, and a recording medium storing a computer program which achieves the connection control unit.

It is another object of the present invention to provide a connection control unit which is designed in such a way as to send required update information to a terminal unit when having decided that connection of the terminal unit should not be allowed, and can thus improve the security level of that terminal unit which has made a connection request.

An opened network connection control method according to the first aspect of the present invention, for connecting to an opened network from a closed network, the closed network comprises: terminal units connected to one another in such a way as to be able to exchange data with one another; a central unit which receives a connection request to the opened network from each of the terminal units, and controls connection to the opened network; and a connection control unit which receives an assignment request for a virtual logic identifier from the central unit and assigns the virtual logic identifier to each of the terminal units, and the connection control method comprises the following steps of storing connection condition information on connection to the opened network necessary for ensuring a network security, receiving an assignment request from the central unit, acquiring connection history information on connection of said terminal unit which corresponds to the assignment request to the opened network, determining whether the acquired connection history information fulfills the connection condition information or not, and assigning the virtual logic identifier to the terminal unit corresponding to the assignment request when it is determined that the acquired connection history information fulfills the connection condition information.

An opened network connection control system according to the second aspect of the present invention comprises: terminal units; a central unit which receives a connection request to the opened network from each of the terminal units, and controls connection to the opened network; and a connection control unit which receives an assignment request for a virtual logic identifier from the central unit and assigns the virtual logic identifier to each of the terminal units, wherein the terminal units are connected, and the connection control unit comprises a processor capable of performing the following operations of storing connection condition information on connection to the opened network necessary for ensuring security, receiving an assignment request from the central unit, acquiring connection history information on connection of the terminal unit which corresponds to the assignment request to the opened network, determining whether the acquired connection history information fulfills the connection condition information or not, and assigning the virtual logic identifier to the terminal unit corresponding to the assignment request in case that it is determined that the acquired connection history information fulfills the connection condition information.

According to the third aspect of the present invention, the connection control unit in the second aspect of the present invention comprises said processor further capable of performing the operation of sending information on an item of the connection condition information which is not fulfilled by the connection history information to the terminal unit corresponding to the assignment request in case that it is determined that the acquired connection history information does not fulfill the connection condition information, and each of the terminal units comprises a processor capable of performing the operations of receiving information on the item of the connection condition information which is not fulfilled, updating the connection history information according to the information on the item of the connection condition information which is not fulfilled, and storing the updated connection history information.

According to the fourth aspect of the present invention, there is provided a connection control unit, which receives a connection request to the opened network from a terminal unit, and receives an assignment request for a virtual logic identifier from a central unit which controls connection to the opened network, and assigns the virtual logic identifier to the terminal unit, wherein the connection control unit comprises a processor capable of performing the following operations of storing connection condition information on connection to the opened network necessary for ensuring security, receiving an assignment request from the central unit, acquiring connection history information on connection of said terminal unit which corresponds to the assignment request to the opened network, determining whether the acquired connection history information fulfills the connection condition information or not, and assigning the virtual logic identifier to the terminal unit corresponding to the assignment request when it is determined that the connection history information fulfills the connection condition information.

According to the fifth aspect of the present invention, there is provided a recording medium storing a computer program for causing a computer to receive a connection request to the opened network from a terminal unit, to receive an assignment request for a virtual logic identifier from a central unit which controls connection to the opened network, and to assign the virtual logic identifier to the terminal unit, wherein the connection control unit previously stores connection condition information on connection to the opened network necessary for ensuring security, and the computer program stored in the recording medium comprises the steps of causing a computer to receive an assignment request from the central unit, causing a computer to acquire connection history information on connection of the terminal unit which corresponds to the assignment request to the opened network, causing a computer to determine whether the acquired connection history information fulfills the connection condition information or not, and causing a computer to assign the virtual logic identifier to the terminal unit corresponding to the assignment request in case that it is determined that the acquired connection history information fulfills the connection condition information.

According to the first, second, fourth and fifth aspects of the present invention, the connection control unit that controls connection of terminal units to an opened network stores connection condition information necessary for ensuring security beforehand. When the terminal unit made a connection request to an opened network, the central unit which received the connection request send an assignment request for a virtual logic identifier to the connection control unit, the connection control unit receives the assignment request from the central unit, and acquires connection history information of that terminal unit which corresponds to the assignment request, and determines whether the acquired connection history information fulfills the stored connection condition information or not. When the connection history information matches with the connection condition information, for example, the connection control unit decides that the connection history information of the terminal unit fulfills the connection condition information, and assigns a virtual logic identifier, e.g., a local IP address, to the terminal unit, so that the terminal unit can be connected to the opened network. This can allow the terminal unit to connect to the opened network via the central unit using the assigned local IP address.

According to the third aspect of the present invention, when the connection history information of that terminal unit which corresponds to the assignment request does not fulfill the connection condition information stored in the connection control unit, the connection control unit does not assign a virtual logic identifier, e.g., a local IP address, to the terminal unit, so that the terminal unit cannot be connected to the opened network. The connection control unit sends the terminal unit an information on the condition item which is needed for the terminal unit to fulfill the connection condition information. Receiving the information on the condition item which is needed to fulfill the connection condition information, the terminal unit can improve the security level of the terminal unit to the one that meets the connection condition based on the security policy.

According to the first, second, fourth and fifth aspects of the present invention, as connection condition information based on the security policy is stored in advance, the connection condition information can be used as a criterion to determine whether connection of a terminal unit to an opened network is permitted or not at the time of connecting the terminal unit to the opened network. Further, it is possible to determine whether or not the terminal unit that has sent the central unit a connection request to an opened network meets the connection condition information. Hence, the present invention can prevent a terminal unit whose security level is lower than a given level from being connected to an opened network and can maintain the security level of the closed network. Even when change in the security policy suddenly becomes necessary due to the menace of new viruses, illegitimate use by a malignant third party, or the like, the security of those terminal units which are to be connected to an opened network can be updated to the latest state by updating the stored connection condition information. Therefore, at the time of connecting the terminal unit can maintain a state of complying with the latest security policy automatically.

According to the third aspect of the present invention, even when a terminal unit whose security level is lower than a given level makes a request for connection to an external network, the security level of the terminal unit can easily be improved to the level based on the security policy.

The above and further objects and features of the invention will more fully be apparent from the following detailed description with accompanying drawings.

BRIEF DESCRIPTION OF THE DRAWINGS

FIG. 2 is a conceptual diagram showing the structure of a connection-condition information database;

FIG. 3 is a conceptual diagram showing the structure of a temporary-IP-address information database;

FIG. 4 is a conceptual diagram showing the structure of a temporary-IP assignment database;

FIG. 5 is a conceptual diagram showing the structure of an update information database;

FIG. 12 is a conceptual diagram showing the structure of a connection-history information database of a network connection control system according to a second embodiment of the present invention;

DETAILED DESCRIPTION OF THE INVENTION

Figure 1:
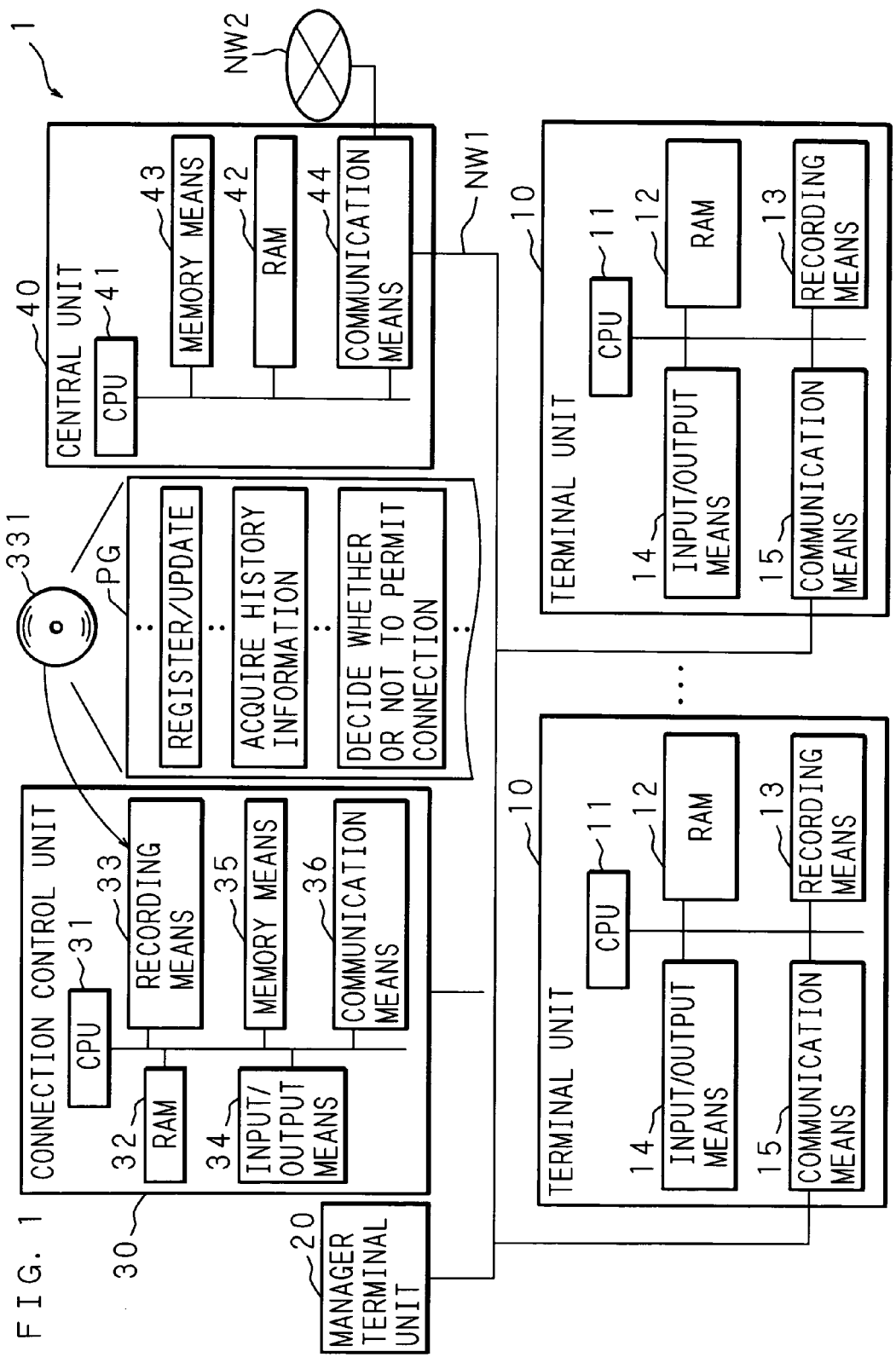
FIG. 1 is a block diagram illustrating the configuration of a network connection control system according to a first embodiment of the present invention.

As described above, according to the prior art, as an example of a specific measure to comply with the security policy, a network manager merely prepares a notification of updating a software (operating system, browser, virus definition file, etc.) which has been installed in a terminal unit into a new version number, and distributes the document to network users to prompt the users to comply with the connection conditions based on the security policy. The prior art further has a shortcoming that the user of each terminal unit is charged with a work of installing an update program to update the operating system, the browser, the virus definition file, etc., which are installed in a terminal unit, in order to comply with the connection conditions based on the security policy. Accordingly, a terminal unit can connect to a network whether the terminal unit fulfills the connection information based on the security policy or not. In the above mentioned situation, it is extremely difficult to maintain the security level of the closed network. The prior art has another shortcoming that when the security policy is changed, the network manager informs the users of the individual terminal units of that event using an e-mail, a BBS or so, but this method has a difficulty in sufficiently letting all the users know update of the connection conditions corresponding to a change in security policy.

The present invention has been made in view of the above situation, and aims at providing an opened network connection control method, and an opened network connection control system, which are provided with a connection control unit that compares connection history information of terminal units in a closed network with connection condition information, determines whether the connection history information fulfills the connection condition information or not, and controls connection of the terminal units, in case where the terminal units in the closed network are connected to an opened network, and can prevent the terminal units from being unconditionally connected to an opened network and allow only those terminal units capable of keeping a predetermined security level to be connected to an opened network, thereby keeping the security level of the closed network, and also providing the connection control unit, and a recording medium storing a computer program which achieves the connection control unit.

It is another object of the present invention to provide an opened network connection control method, an opened network connection control system and a connection control unit, which are designed in such a way that when the connection control unit decides that the connection history information does not fulfill the connection condition information, required update information is sent to the terminal unit, thus improving the security level of that terminal unit which has made a connection request, and a recording medium storing a computer program which achieves the connection control unit. The opened network connection control method, the opened network connection control system, the connection control unit, and the recording medium are provided by the following embodiments.

First Embodiment

FIG. 1 is a block diagram illustrating the configuration of an opened network connection control system 1 according to the first embodiment of the present invention. Terminal units that are used by users to connect to an opened network NW2 which is typified by the Internet are denoted by "10". The terminal units 10 are connected to a closed network NW1 which is also connected with a connection control unit 30 that controls connection of the terminal units 10, a central unit 40 that is a proxy server connected to an opened network NW2, and a manager terminal unit 20 that registers and updates connection condition information in the connection control unit 30.

In the embodiment, the terminal unit 10 has a CPU 11, a RAM 12, recording means 13, input/output means 14, and communication means 15. Recorded in the recording means 13 are an operating system (OS), a browser for browsing Web pages, a virus definition file (which describes characteristics of virus-infected files, viruses, etc.), a virus monitoring program, history-information acquiring program, and so forth. In addition, Java (registered trademark), VMJava (registered trademark) VM for make an applet executable are also recorded in the recording means 13. Also recorded in the recording means 13 is connection history information which is constructed by a combination of keywords about security items of the OS, the browser, the virus definition file, etc., and version numbers applied to the individual security items. The communication means 15 is connected to the closed network NW1.

As the browser is loaded into the RAM 12, the CPU 11 of the terminal unit 10 serves as the connection control unit 30 and the browser to access the central unit 40. To access the central unit 40, for example, the terminal unit 10 makes the access by using URL which is a specific symbol to specify information present in the central unit 40. The URL is comprised of a scheme name indicating HTTP (Hyper Text Transfer Protocol), a domain name indicating information for connection to the central unit 40, and a path name indicating the location of a file in the central unit 40. Specifying the URL, the terminal unit 10 sends the central unit 40 a request for creation, edition, deletion, display and so forth of information.

As the Java VM is loaded into the RAM 12, the CPU 11 of the terminal unit 10 interprets a Java applet described in Java, and executes it. Receiving a Java applet from the central unit 40, for example, the terminal unit 10 can run a desired program. As the virus monitoring program is loaded into the RAM 12, the CPU 11 of the terminal unit 10 monitors whether a file, a document file of an e-mail or so received by the terminal unit 10 is infected by a virus or not.

The connection control unit 30 has recording means 33 which drives a CD-ROM 331 where a computer program PG of the present invention is recorded, a RAM 32 for temporarily storing the computer program PG, communication means 36 for connection to the closed network NW1, input/output means 34, such as a mouse, a keyboard and a display, memory means 35 which stores various kinds of databases, such as connection condition information based on the security policy and a temporary IP address, and a CPU 31 which runs the computer program PG.

Stored in the memory means 35 are a connection-condition information database 351 storing connection condition information, a temporary-IP-address information database 352 indicating the range of temporary IP addresses, a temporary-IP assignment database 353 indicating the assignment status of temporary IP addresses, and an update information database 354 storing update information (the update program, the virus definition file, etc.) to comply with the connection condition information. As the computer program PG is run, the CPU 31 accesses those various kinds of databases.

The CPU 31 of the connection control unit 30 activates a Java servlet according to requests from the terminal units 10 and the manager terminal unit 20, writes the requested information as an HTML file described in HTML (Hyper Text Markup Language) which is a a page describing language, and sends the HTML file to the terminal units 10 and the manager terminal unit 20. Accordingly, the browsers installed in the terminal units 10 and the manager terminal unit 20 analyze and display the HTML file thus sent.

The CPU 31 of the connection control unit 30 loads the computer program PG, recorded in the CD-ROM 331, into the RAM 32, and runs the loaded computer program PG to serve as a DHCP server. Upon reception of an assignment request for a temporary IP address from the central unit 40, the CPU 31 of the connection control unit 30 determines whether or not the terminal unit 10 corresponding to the assignment request, i.e., the terminal unit 10 which has sent a request for connection to the opened network to the central unit 40, retains stored connection condition information. That is, the CPU 31 determines whether the security level of the terminal unit 10 reaches a given level or not, and dynamically assigns a local IP address to the terminal unit 10 corresponding to the assignment request when having determined that the security level reaches the given level. This allows the terminal unit 10 to be connected to the opened network NW2 via the central unit 40 and be able to freely access information on the Internet.

The manager terminal unit 20 has a structure similar to the structure of the terminal unit 10, and registers and updates information in various kinds of databases stored in the memory means 35 of the connection control unit 30.

The central unit 40 has a capability as a proxy server, and a capability of a gateway to connect the closed network NW1 to the opened network NW2 via the communication means 44.

FIG. 2 is a conceptual diagram showing the structure of the connection-condition information database, FIG. 3 is a conceptual diagram showing the structure of the temporary-IP-address information database, FIG. 4 is a conceptual diagram showing the structure of the temporary-IP assignment database, and FIG. 5 is a conceptual diagram showing the structure of the update information database. The connection-condition information database 351 defines connection conditions with which the terminal units 10 to be connected to the opened network NW2 should be provided to comply with the internal rules set in a company or so based on the security policy. The connection-condition information database 351 is comprised of keywords indicating items, such as the OS, the browser, and the virus definition file, stored in the terminal units 10, update numbers relating to the keywords (the version number of the update program, the version number of the virus definition file, etc.) and a field indicating URLs for acquiring update information for update to the security levels indicated by the update numbers.

The network manager registers and updates an update number corresponding to each keyword using the manager terminal unit 20. The network manager also registers and updates an URL through which update information indicated by each update number can be acquired. Accordingly, update numbers corresponding to the individual keywords and the URLs for acquisition of update information indicated by the update numbers are recorded in the connection-condition information database 351.

The temporary-IP-address information database 352 previously defines the range of temporary IP addresses to be assigned to the terminal units 10 that request connection to the opened network NW2. The temporary-IP-address information database 352 is comprised of parameters and a field of set values of the parameters. The parameters include a sub net which is one of plural network segments of the closed network NW1, a sub-net mask and the range of temporary IP addresses, and the set values of the individual parameters are recorded in the set value filed.

The manager registers and updates the set values of the individual parameters using the manager terminal unit 20. This can allow the connection control unit 30 to set the ranges of local IP addresses to be assigned to the terminal units 10, making it possible to distinguish those terminal units 10 which can be connected to the opened network NW2 and those terminal units 10 which cannot.

The temporary-IP assignment database 353 indicates in which ones of the terminal units 10 connected to the closed network NW1 temporary IP addresses are assigned. The temporary-IP assignment database 353 is comprised of fields indicating terminal unit IDs, temporary IP addresses and the statuses of the terminal units (assigned, unassigned, etc.). The terminal unit ID is a MAC (Media Access Control) address or an identification address specific to each terminal unit to be connected to a network. The terminal unit ID is recorded in the temporary-IP assignment database 353 every time a terminal unit 10 is installed in the closed network NW1.

To assign a temporary IP address to a terminal unit 10, the connection control unit 30 decides a temporary IP address in the temporary IP address range defined in the temporary-IP-address information database 352 which has not been used yet, and records the assigned temporary IP address and the status of the terminal unit 10, together with the ID of the terminal unit 10, in the temporary-IP-address information database 352. A temporary IP address of a terminal unit given by "0, 0, 0, 0" indicates that no temporary IP address has been assigned to the terminal unit.

The update information database 354 is comprised of a field indicating update numbers and a field indicating update information. Update information needed to update the OS, the browser, the virus definition file, etc., installed in each terminal unit 10 to the levels indicated by update numbers is stored in association with the update numbers in the update information database 354.

When update information indicated by an update number is not stored, the connection control unit 30 acquires an URL where the update information is stored from the connection-condition information database 351, acquires the update information from the location that is designated by the URL on the Internet, and stores the update information in the update information database 354.

Figure 6:
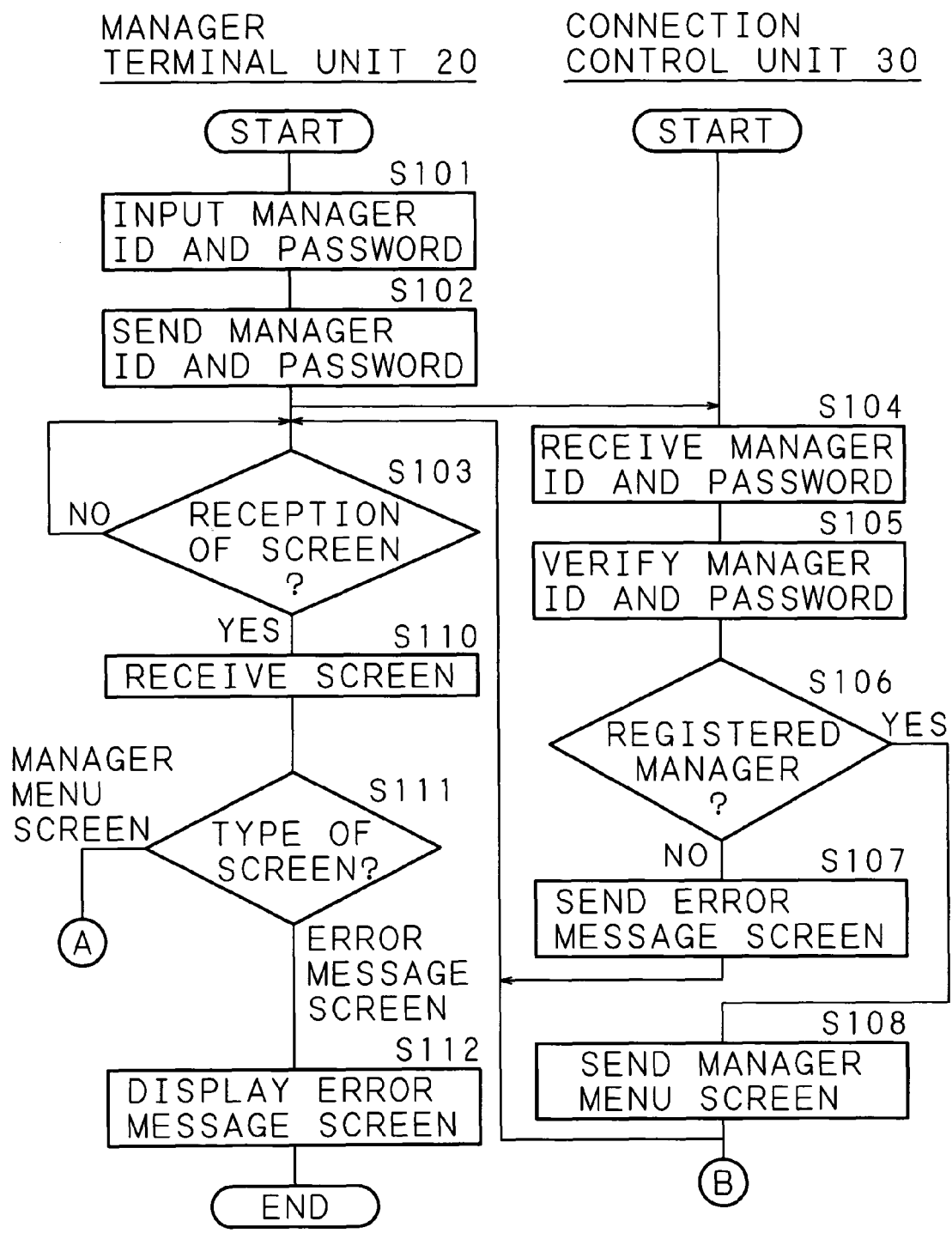
FIG. 6 is a flowchart illustrating the registration and update procedures for connection condition information of the opened network connection control system according to the first embodiment of the present invention.
Figure 7:
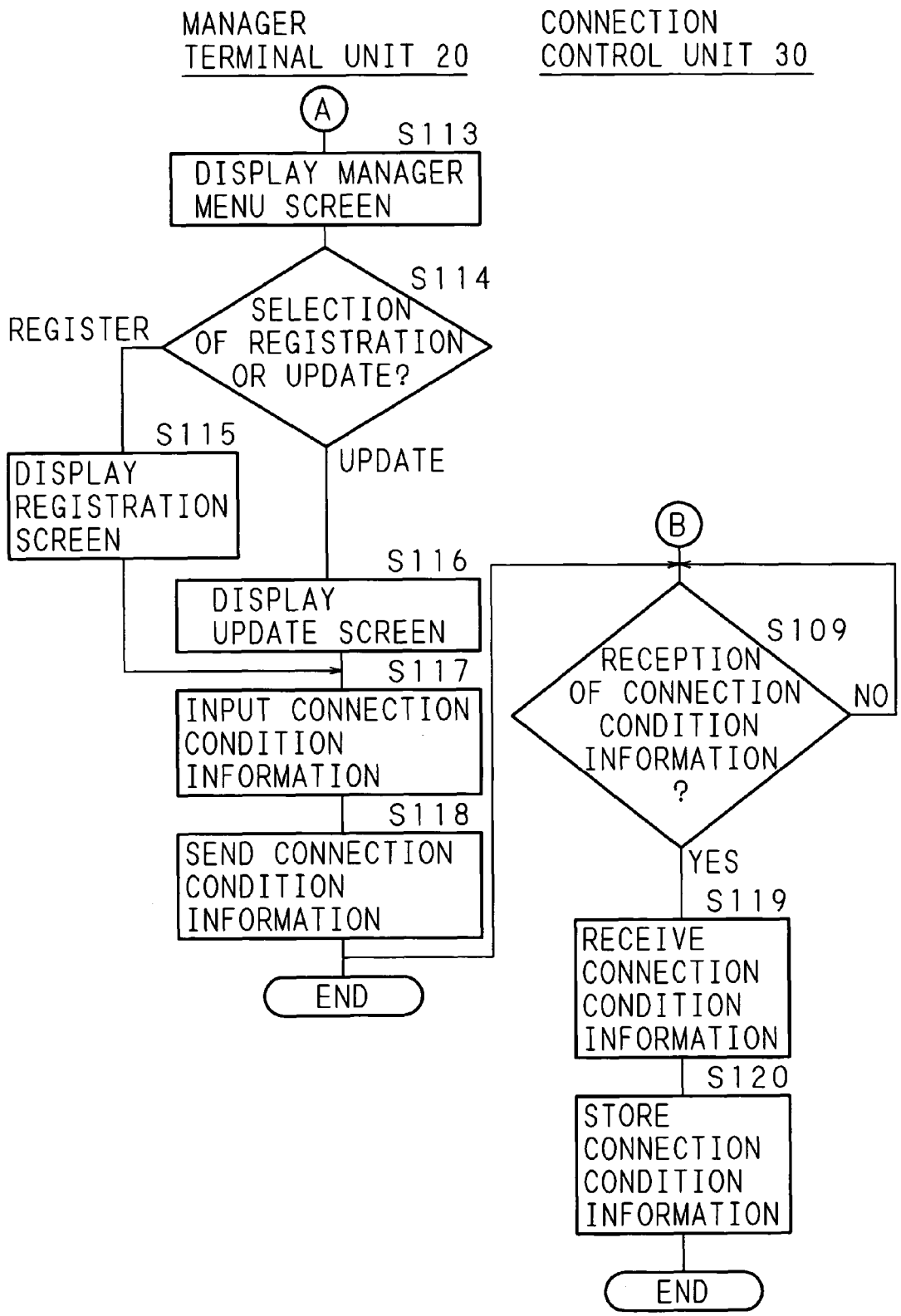
FIG. 7 is a flowchart illustrating the registration and update procedures for connection condition information of the opened network connection control system according to the first embodiment of the present invention.
Figure 8:
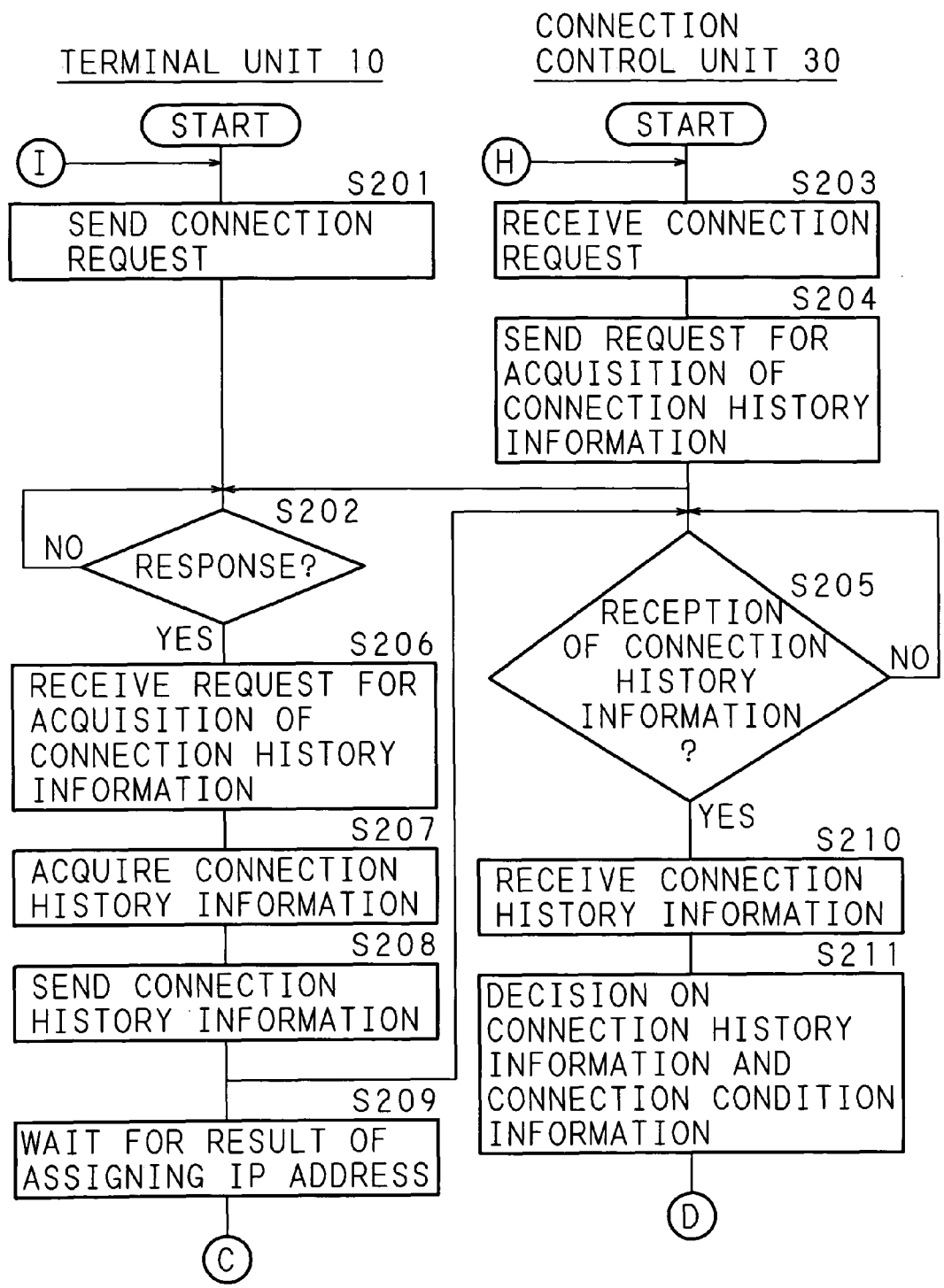
FIG. 8 is a flowchart illustrating the connection control procedures for a terminal unit of the network connection control system according to the first embodiment of the present invention.
Figure 9:
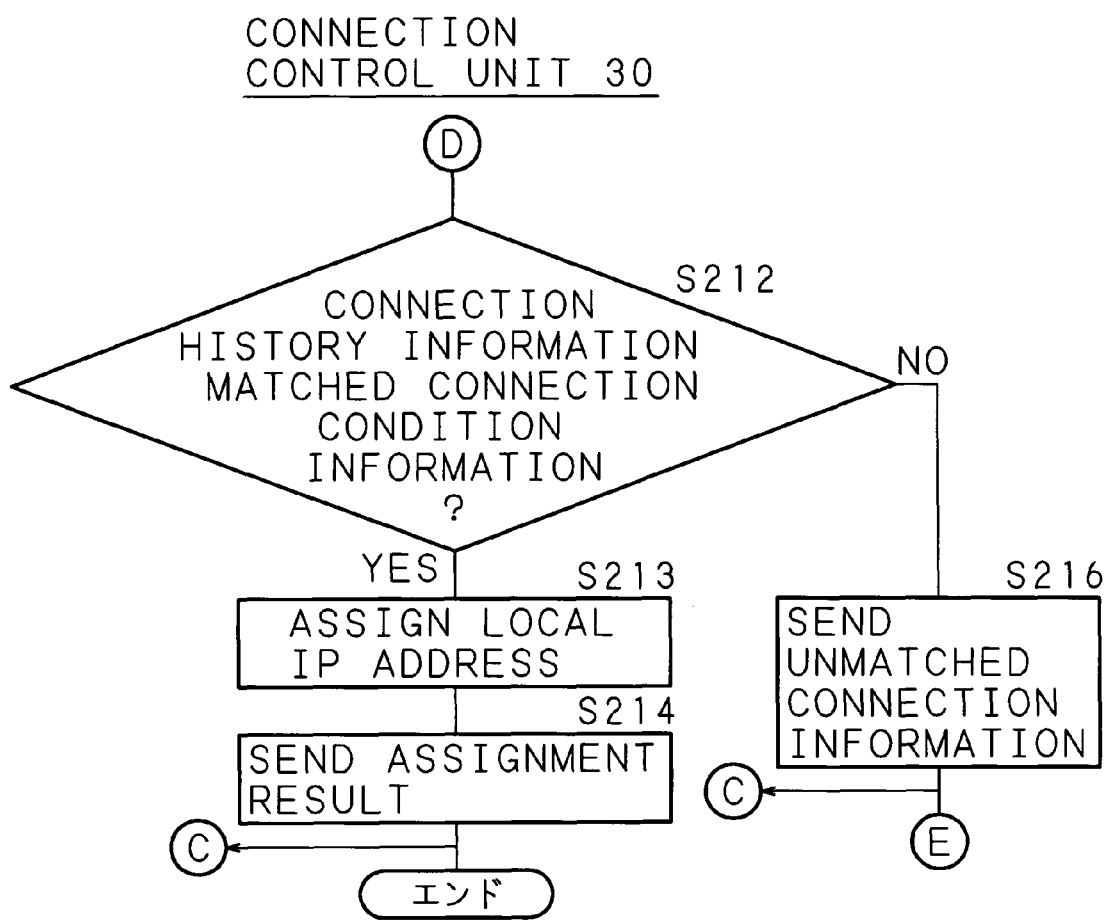
FIG. 9 is a flowchart illustrating the connection control procedures for a terminal unit of the network connection control system according to the first embodiment of the present invention.
Figure 10:
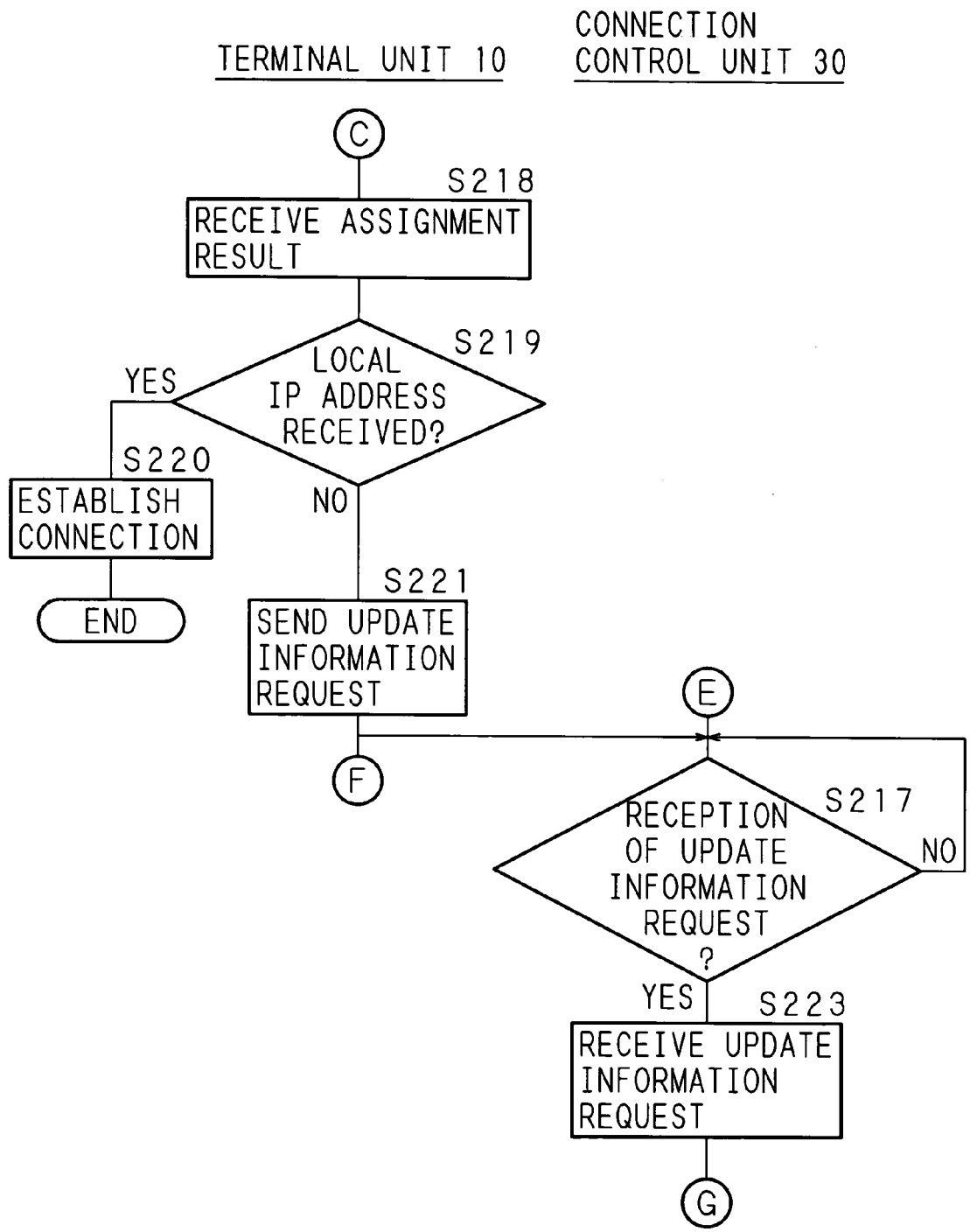
FIG. 10 is a flowchart illustrating the connection control procedures for a terminal unit of the network connection control system according to the first embodiment of the present invention.
Figure 11:
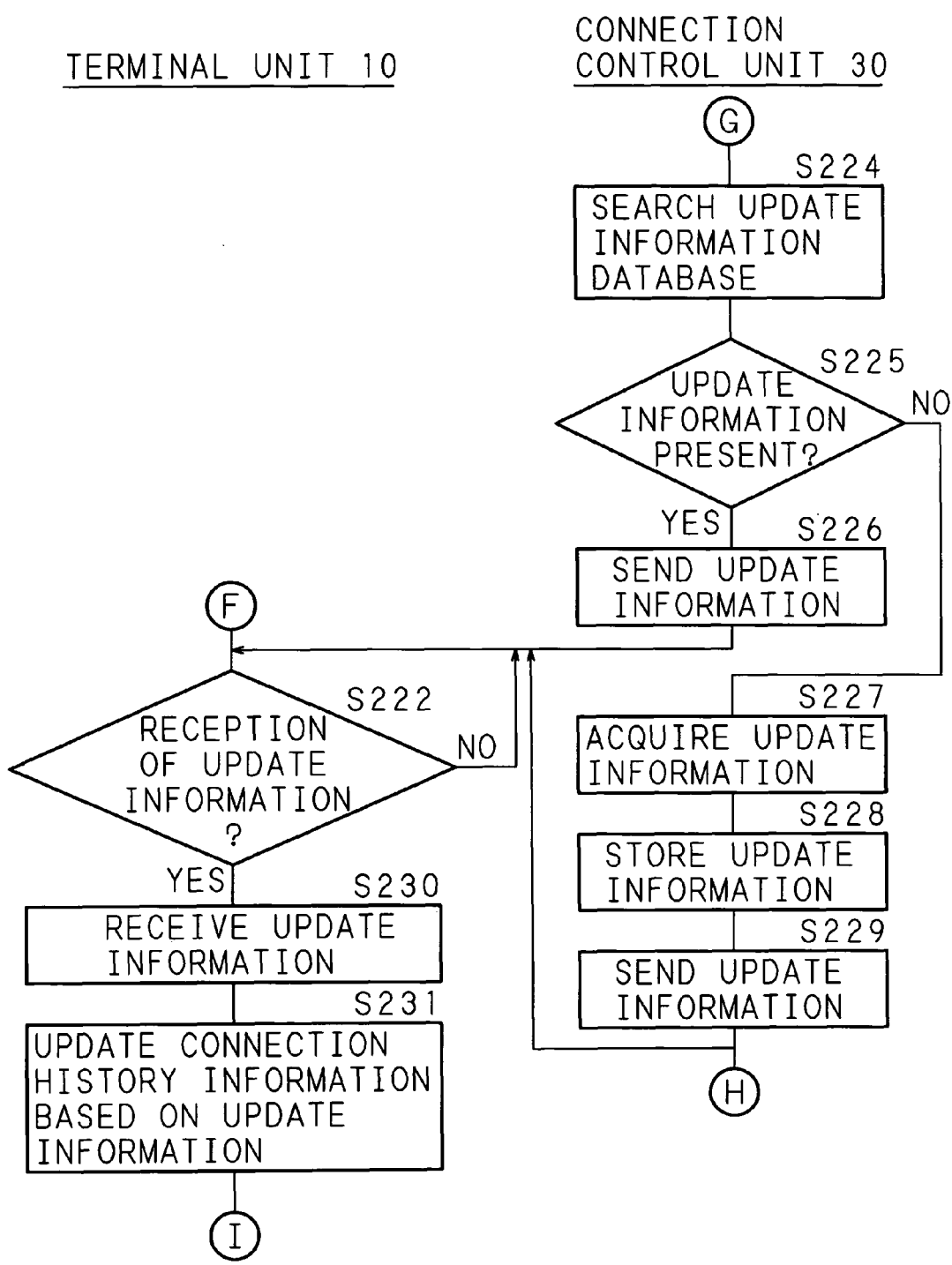
FIG. 11 is a flowchart illustrating the connection control procedures for a terminal unit of the network connection control system according to the first embodiment of the present invention.
Figure 13:
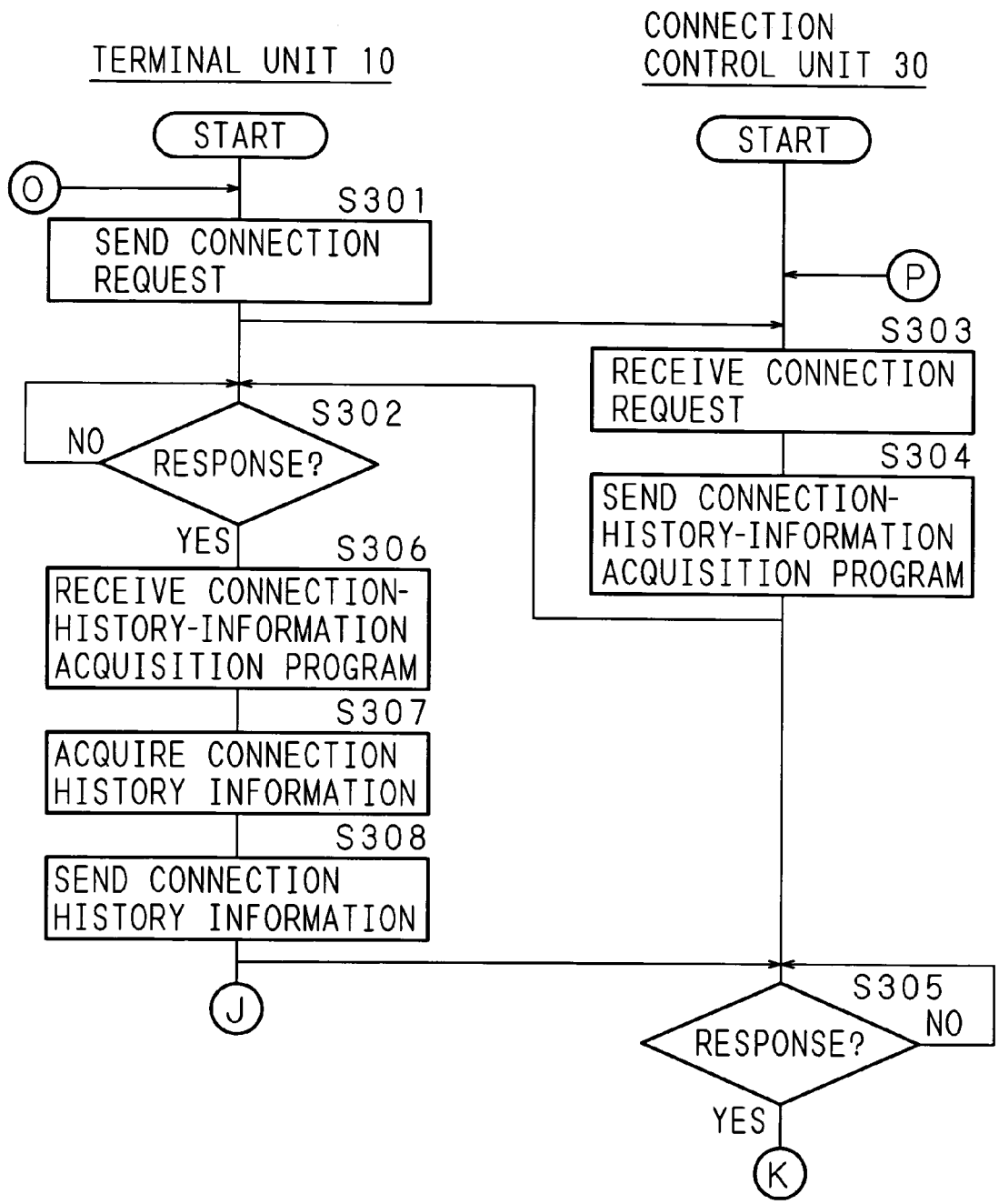
FIG. 13 is a flowchart illustrating the connection control procedures for a terminal unit of a network connection control system according to a third embodiment of the present invention.
Figure 14:
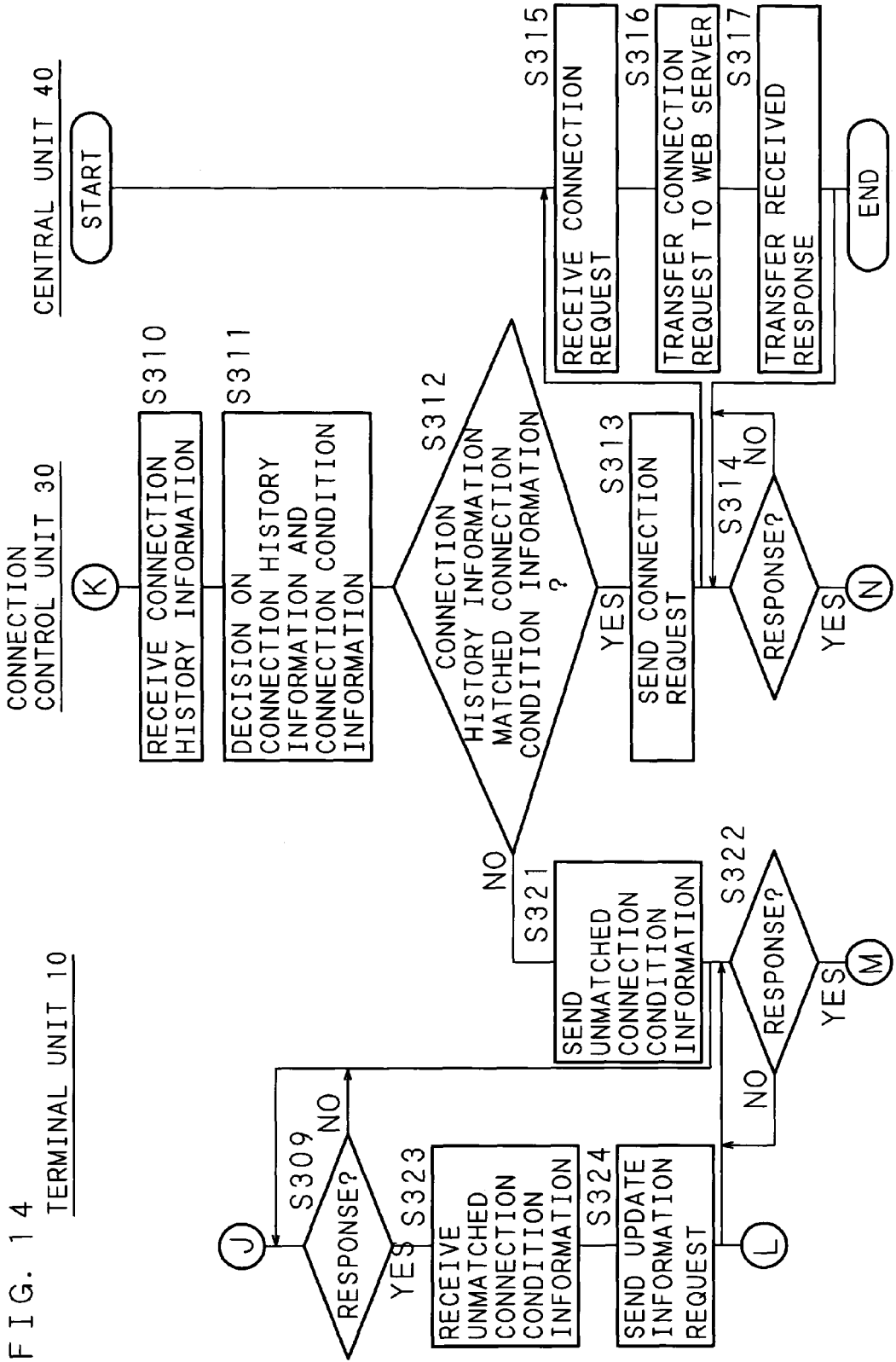
FIG. 14 is a flowchart illustrating the connection control procedures for a terminal unit of the opened network connection control system according to the third embodiment of the present invention.
Figure 15:
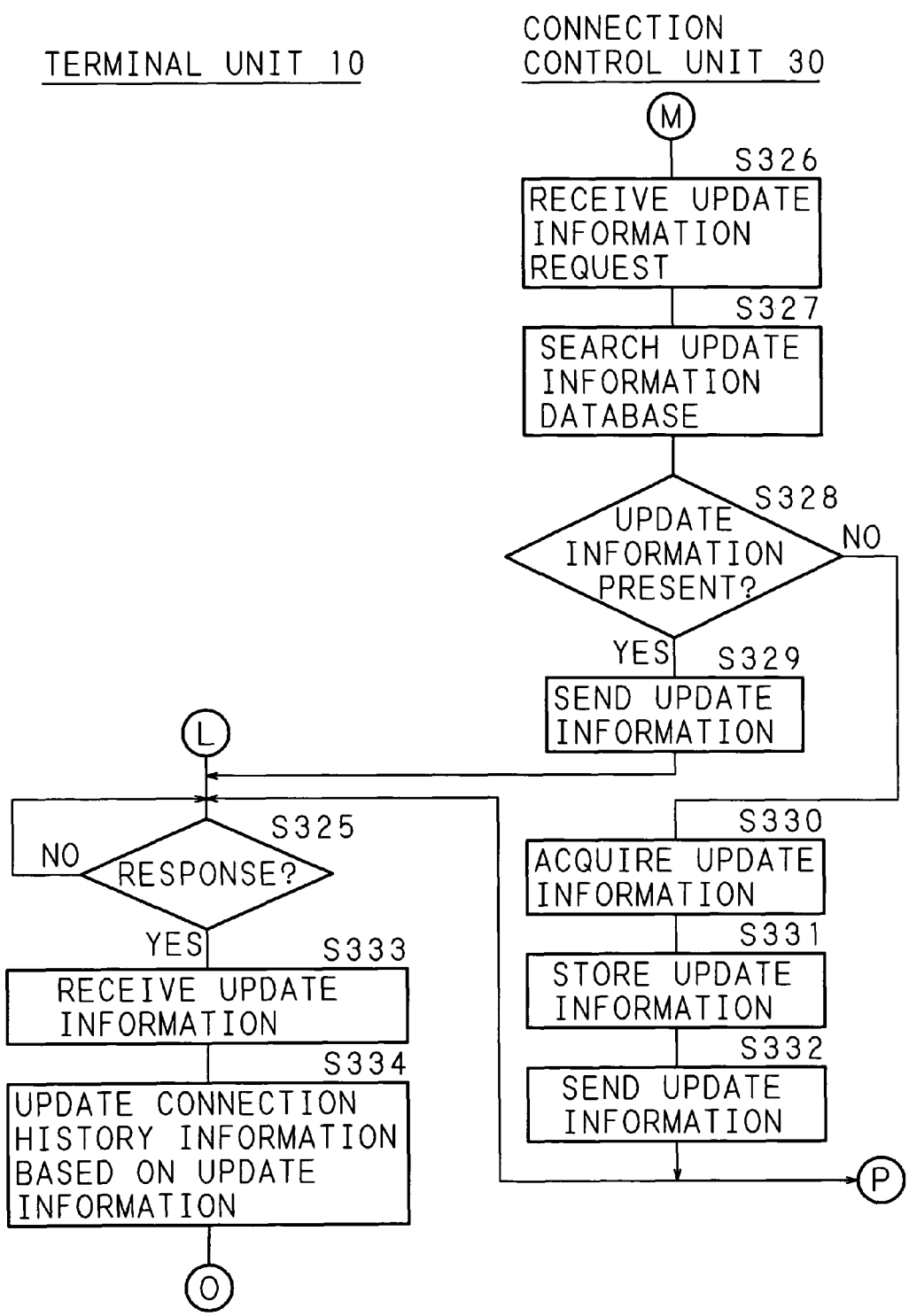
FIG. 15 is a flowchart illustrating the connection control procedures for a terminal unit of the opened network connection control system according to the third embodiment of the present invention.
Figure 16:
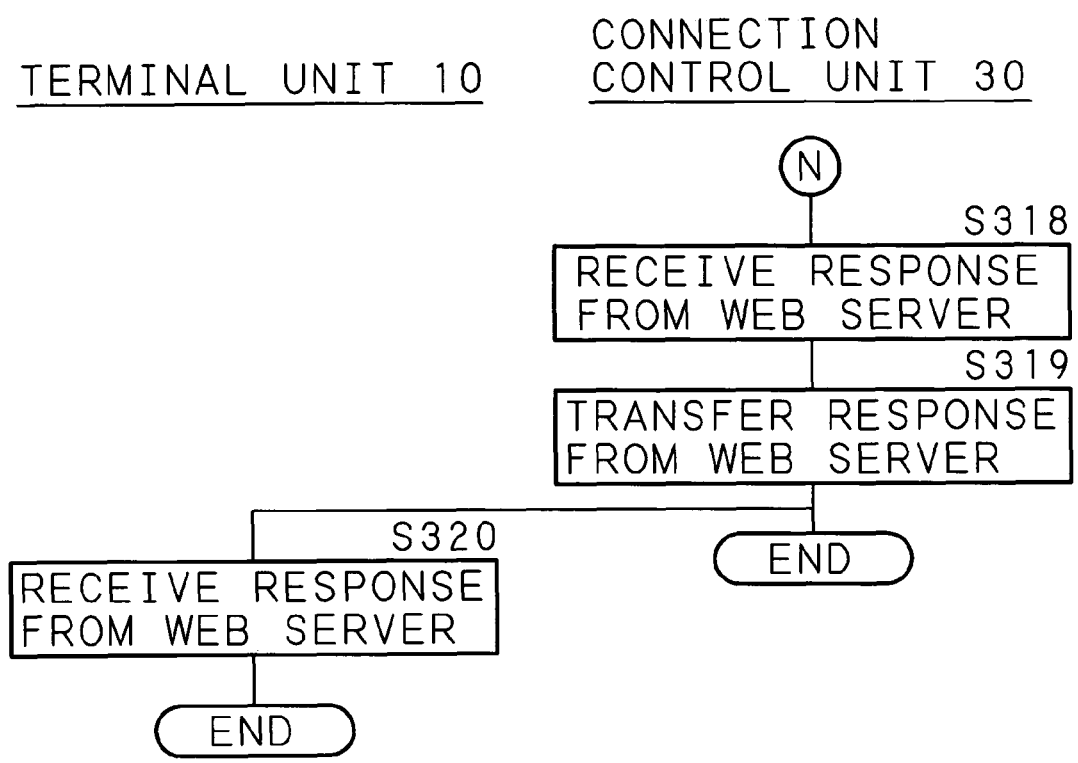
FIG. 16 is a flowchart illustrating the connection control procedures for a terminal unit of the opened network connection control system according to the third embodiment of the present invention.

A description will now be given of the processing procedures of the opened network connection control system according to the first embodiment of the present invention. FIGS. 6 and 7 are flowcharts illustrating the registration and update procedures for connection condition information of the opened network connection control system according to the first embodiment of the present invention. The manager terminal unit 20 receives a manager ID and a password given by the network manager (step S101). The manager terminal unit 20 sends the received manager ID and password as an HTTP request to the connection control unit 30 (step S102), and decides whether a screen is received from the connection control unit 30 or not (step S103). When there is no screen received (step S103: NO), the manager terminal unit 20 continues the process at step S103.

The CPU 31 of the connection control unit 30 which is waiting for log-on from the manager terminal unit 20 receives the sent manager ID and password (step S104), and verify the received manager ID and password against a manager ID and a password previously registered (step S105). When the CPU 31 decides that the received manager ID and password are not those of the registered manager (step S106: NO), the CPU 31 creates an HTML file for an error message screen and sends the file to the manager terminal unit 20 (step S107).

When the CPU 31 decides that the received manager ID and password are those of the registered manager (step S106: YES), the connection control unit 30 creates an HTML file for a menu screen for the manager, sends the file to the manager terminal unit 20 (step S108), and determines whether connection condition information has been received from the manager terminal unit 20 or not (step S109). When the CPU 31 decides that there is no connection condition information relived (step S109: NO), the process at step S109 is continued.

When the HTML file for the error message screen is sent from the connection control unit 30 at step S107 or step S108, the manager terminal unit 20 decides at step S103 that there is a screen received (step S103: YES), and receives the HTML file for the screen sent from the connection control unit 30 (step S110). When it is determined that the type of the screen is the error message screen (step S111: error message screen), the manager terminal unit 20 displays the error message screen (step S112) and then terminates the process. When it is determined that the type of the received screen is the manager menu screen (step S111: manager menu screen), the manager terminal unit 20 displays the manager menu screen (step S113).

When selection of a registration screen by the manager is accepted on the manager menu screen (step S114: register), the manager terminal unit 20 displays the registration screen (step S115). When selection of an update screen by the manager is accepted (step S114: update), the manager terminal unit 20 displays the update screen (step S116).

The manager terminal unit 20 receives, on the displayed screen, connection condition information about the security (e.g., an URL for acquisition of the update number or the update program of the OS, the browser or the virus definition file, or the update information on the virus definition file or so) (step S117). The manager terminal unit 20 sends the received connection condition information to the connection control unit 30 (step S118), then terminates the process.

When the connection condition information is sent from the manager terminal unit 20 at step S118, the CPU 31 of the connection control unit 30 decides at step S109 that the connection condition information has been received (step S109: YES), receives the sent connection condition information (step S119), stores the received connection condition information in the connection-condition information database 351 keyword by keyword (step S120), then terminates the process.

FIGS. 8 through 11 are flowcharts illustrating the connection control procedures for the terminal unit 10 of the opened network connection control system according to the first embodiment of the present invention. When the communication means 15 of the terminal unit 10 detects physical connection to the closed network NW1, the CPU 11 of the terminal unit 10 sends a connection request to the central unit 40 (step S201), and decides whether there is a response from the central unit 40 or not (step S202). When there is no response (step S202: NO), the CPU 11 continues the process at step S202.

A CPU 41 of the central unit 40 receives the connection request from the terminal unit 10, and sends the connection control unit 30 an assignment request for a temporary IP address to the terminal unit 10 which has sent the connection request. The CPU 31 of the connection control unit 30 receives the assignment request sent from the central unit 40 (step S203), sends a request for acquisition of the connection history information to the terminal unit 10 (step S204), and decides whether the connection history information from the terminal unit 10 has been received or not (step S205). When there is no connection history information received (step S205: NO), the CPU 31 continues the process at step S205.

When the request for acquisition of the connection history information is sent from the connection control unit 30 at step S204, the CPU 11 of the terminal unit 10 decides that there is a response at step S202 (step S202: YES), receives the request for acquisition of the connection history information (step S206), acquires the connection history information recorded in the recording means 13 keyword by keyword by executing the program for acquisition of the connection history information (step S207), sends the acquired connection history information to the connection control unit 30 (step S208), and waits for the result of assignment of the IP address (step S209).

When the connection history information is sent from the terminal unit 10 at step S208, the CPU 31 of the connection control unit 30 decides that the connection history information has been received at step S205 (step S205: YES), receives the connection history information sent from the terminal unit 10 (step S210), and searches the connection-condition information database 351 to determine whether the connection history information of the terminal unit 10 fulfills the connection condition information for every keyword included in the connection history information or not (step S211). For example, when the update number in the connection history information is compared with the update numbers in the connection condition information for each keyword in the connection history information of the terminal unit 10 and there is any matched update number in the connection condition information, the CPU 31 decides that the connection history information fulfills the connection condition information (step S212: YES), and the CPU 31 assigns a local IP address to the terminal unit 10 (steppu S213), sends the result of assignment of the local IP address to the terminal unit 10 (step S214), then terminates the process.

When the comparison of the update number in the connection history information for each keyword in the connection history information of the terminal unit 10 does not result in a match, the CPU 31 decides that the connection history information does not fulfill the connection condition information (step S212: NO), and the CPU 31 of the connection control unit 30 sends the connection condition information (update number) that does not match the connection history information for each keyword to the terminal unit 10 (step S216), and determines whether an update information request from the terminal unit 10 has been received or not (step S217). When the CPU 31 decides that there is no update information received (step S217: NO), the CPU 31 continues the process at step S217.

When the assignment result is sent from the connection control unit 30 at step S214, the CPU 11 of the terminal unit 10 receives the assignment result (step S218), and determines whether the received assignment result is a local IP address or not (step S219). When the CPU 11 decides that a local IP address has been received (step S219: YES), the CPU 11 establishes connection with the central unit 40 (step S220) and terminates the connection control process. Then, the terminal unit 10 is connected to the opened network NW2 via the central unit 40.

When the CPU 11 does not decide that a local IP address has been received (step S219: NO), the CPU 11 of the terminal unit 10 sends the update information request including unmatched update number in the connection condition information for each keyword to the connection control unit 30 (step S221), and determines whether update information has been received or not (step S222). When the CPU 11 decides that there is no update information received (step S222: NO), the CPU 11 continues the process at step S222.

When the update information request is sent from the terminal unit 10 at step S221, the CPU 31 of the connection control unit 30 decides that the update information request has been received at step S217 (step S217: YES), the CPU 31 receives the update information request sent from the terminal unit 10 (step S223), searches the update information database 354 based on the update number for each keyword included in the received update information request (step S224), and determines whether update information indicated by the update number is stored or not (step S225). When the CPU 31 of the connection control unit 30 decides that update information indicated by the update number is stored (step S225: YES), the CPU 31 sends the update information to the terminal unit 10 (step S226).

When the CPU 31 of the connection control unit 30 does not decide that update information indicated by the update number is stored (step S225: NO), the CPU 31 searches the connection-condition information database 351 to retrieve the URL corresponding to the update number, sends an HTTP request based on the retrieved URL to acquire update information from a predetermined server of the opened network NW2 (step S227). The CPU 31 of the connection control unit 30 stores the acquired update information in the update information database 354 (step S228), sends the stored update information to the terminal unit 10 (step S229), and continues the process of a sequence of steps starting at step S203.

When the update information is sent from the connection control unit 30 at step S226 or step S229, the CPU 11 of the terminal unit 10 decides that the update information has been received at step S222 (step S222: YES), and receives the update information sent from the connection control unit 30 (step S230). The CPU 11 of the terminal unit 10 updates the connection history information recorded in the recording means 13 based on the received update information (step S231), and continues the process at step S201.

Through the above-described procedures, the connection control unit 30 terminates the connection control procedures when a local IP address is assigned the terminal unit 10.

According to the embodiment, as described above, in case of connecting the terminal units 10 of the closed network NW1 to the opened network NW2, combinations (connection history information) of the keywords about the connection conditions required to keep the security, such as the OS, the browser, and the virus definition file, installed in each terminal unit 10 and the version numbers applied to the individual connection conditions are acquired are acquired, it is determined whether the acquired connection history information matches the connection condition information registered/updated beforehand based on the security policy or not, and a local IP address is assigned, and the terminal unit 10 is connected to the opened network NW2 only when the terminal unit 10 has the required connection condition information. This prevents the terminal units 10 from being connected to the opened network NW2 unconditionally, regardless of their security levels, reduces probable damages on the terminal units 10 caused by viruses or illegitimate use over the opened network NW2, and can maintain the security level of the closed network NW1.

In case of connecting the terminal units 10 of the closed network NW1 to the opened network NW2, it is determined whether or not to permit connection to the opened network NW2 based on the connection condition information registered/updated beforehand based on the security policy, so that the same decision criterion can be applied to all the terminal units 10 of the closed network NW1 and the decision on permission of the connection can be made based on the same criterion.

Even when a new virus is found which makes it necessary to promptly change the connection condition information and let the changed contents known to the public, it is possible to decide whether or not to connect the terminal units 10 to the opened network NW2 based on connection condition information updated from the connection condition information stored in the connection control unit 30. This can ensure prompt application of a change in the security policy. Further, when an emergency on the security occurs, updating of the connection condition information to dummy connection condition information can temporarily prohibits connection of all the terminal units 10 to the opened network NW2.

When the connection history information of the terminal unit 10 does not coincide with the connection condition information, the terminal unit 10 can be notified of update information needed to fulfill the connection condition information, making it possible to easily improve the security level of the terminal unit 10 to the desired level.

As the connection history information is acquired from a terminal unit 10, it is possible to prevent another terminal unit from pretending to be the terminal unit 10 that has the connection history information fulfilling the connection condition information using the terminal unit ID used by that terminal unit.

In general, different security policies are often set for different companies or associations. However, the use of the present invention brings about an excellent effect of easily ensuring network connection control that complies with different security policies set for different companies or associations.

According to the first embodiment, the connection condition information and the connection history information are version numbers of the OS, the browser, and the virus definition file installed in the terminal unit 10, but are not restrictive. For example, any kind of connection condition information and connection history information, such as the version number of the e-mail application program installed in the terminal unit 10, the presence/absence of password locking of the hard disk drive, can be used as long as the information can maintain the security level.

Although the connection control unit 30 has the JAVA servlet in the first embodiment, it is not restrictive and may take a structure which uses a CGI (Common Gateway Interface) program via a CGI interface or so.

Second Embodiment

The system structure may be modified in such a way that the connection control unit 30 collectively manages the connection history information of the individual terminal units 10 in association with their terminal unit IDs. A connection-history information database 355 where connection history information of each terminal unit is recorded is stored in the memory means 35 of the connection control unit 30.

FIG. 12 is a conceptual diagram showing the structure of the connection-history information database of an opened network connection control system according to the second embodiment of the present invention. The connection-history information database 355 is comprised of terminal unit IDs, connection history information of each terminal unit ID and the date at which the connection history information is recorded. The connection history information is recorded with the latest history of the update number (the version number of the update program, the version number of the virus definition file, or the like) at a higher rank, for each of the keywords corresponding to the OS, the browser, and the virus definition file. The connection history information is registered, updated by the manager. The system may take a structure such that when the connection control unit 30 sends update information to the terminal unit 10, the connection history information is recorded.

When an assignment request is made by the central unit 40, the connection control unit 30 accesses the connection-history information database 355 to acquire the connection history information of the terminal unit 10 corresponding to the assignment request instead of acquiring the connection history information from the terminal unit 10. In this case, the number of connection requests, the result of the decision on permission/inhibition of connection, the number of transmissions of update information, etc. may be recorded for each terminal unit 10. As the structure other than the location to acquire the connection history information is the same as that of the first embodiment, its description will be omitted. When the system structure is modified in such a way that the connection control unit 30 collectively manages the connection history information of the individual terminal units 10 in association with their terminal unit IDs, it is possible to grasp the frequency of usage of each terminal unit 10 and the frequency of update or so from the connection history information of the terminal unit 10, so that an improvement instruction to execute scheduling of regular update of a definition file or so can be given to the terminal unit 10 whose connection has been rejected by the connection control unit 30 multiple times.

Third Embodiment

The system structure may be modified in such a way that the connection control unit 30 having a capability of a proxy server sends a network connection request from the terminal unit 10 which has acquired a local IP address beforehand to the central unit 40 having the capability of a gateway server. FIGS. 13 through 16 are flowcharts illustrating the connection control procedures for the terminal unit 10 of an opened network connection control system according to the third embodiment of the present invention.

The CPU 11 of the terminal unit 10 receives an input URL indicating the server unit connected to the opened network NW2, sends a request for connection to the opened network NW2 to the connection control unit 30 (step S301), and determines whether there is a response from the connection control unit 30 or not (step S302). When the CPU 11 decides that there is no response (step S302: NO), the CPU 11 continues the process at step S302. The destination address to the connection control unit 30 is preset in the browser of the terminal unit 10.

The CPU 31 of the connection control unit 30 receives the connection request from the terminal unit 10 (step S303), sends a connection-history-information acquisition program to the terminal unit 10 (step S304), and determines whether there is a response from the terminal unit 10 or not (step S305). When the CPU 31 decides that there is no response (step S305: NO), the CPU 31 continues the process at step S305.

When the connection-history-information acquisition program is sent from the connection control unit 30 at step S304, the CPU 11 of the terminal unit 10 decides that there is a response at step S302 (step S302: YES), receives the connection-history-information acquisition program from the connection control unit 30 (step S306), acquires the connection history information recorded in the recording means 13 keyword by keyword by executing the connection-history-information acquisition program (step S307), sends the acquired connection history information to the connection control unit 30 (step S308), and determines whether there is a response from the connection control unit 30 or not (step S309). When the CPU 11 decides that there is no response (step S309: NO), the CPU 11 continues the process at step S309.

When the connection history information is sent from the terminal unit 10 at step S308, the CPU 31 of the connection control unit 30 decides that there is a response at step S305 (step S305: YES), receives the connection history information sent from the terminal unit 10 (step S310), and searches the connection-condition information database 351 to determine whether or not the connection history information of the terminal unit 10 fulfills the connection condition information for each keyword included in the connection history information (step S311). When the comparison of the update number in the connection history information of the terminal unit 10 for each keyword results in a match with any of the update numbers in the connection condition information for all the keywords, for example, the CPU 31 decides that the connection history information fulfills the connection condition information (step S312: YES), sends a request for connection to the opened network NW2 to the central unit 40 (step S313), and determines whether there is a response from the central unit 40 or not (step S314). When the CPU 31 decides that there is no response (step S314: NO), the CPU 31 continues the process at step S314.

The CPU 41 of the central unit 40 receives the connection request to the opened network NW2 from the connection control unit 30 (step S315), transfers the connection request to a Web server associated with destination information included in the connection request to the opened network NW2 (step S316), transfers the received response to the connection control unit 30 when a response from the Web server is received (step S317), and terminates the process.

When the response from the central unit 40 is transferred at step S317, the CPU 31 of the connection control unit 30 decides that there is a response at step S314 (step S314: YES), receives the response from the Web server from the central unit 40 (step S318), transfers the received response to the terminal unit 10 (step S319), then terminates the process.

The terminal unit 10 receives the response from the Web server (step S320), displays information based on the received response on the browser, then terminates the process.

When the comparison of the update number in the connection history information of the terminal unit 10 for each keyword does not result in a match with any of the update numbers in the connection condition information for all the keywords, the CPU 31 of the connection control unit 30 decides that the connection history information does not fulfill the connection condition information (step S312: NO), sends the connection condition information (update number) which does not match the connection history information keyword by keyword to the terminal unit 10 (step S321), and determines whether there is a response from the terminal unit 10 or not (step S322). When the CPU 31 decides that there is no response (step S322: NO), the CPU 31 continues the process at step S322.

When the unmatched connection condition information is sent from the connection control unit 30 at step S321, the CPU 11 of the terminal unit 10 decides at step S309 that there is a response from the connection control unit 30 (step S309: YES), receives the unmatched connection condition information from the connection control unit 30 (step S323), sends an update information request containing the update number in the unmatched connection condition information for each keyword to the connection control unit 30 (step S324), and determines whether there is a response from the connection control unit 30 or not (step S325). When the CPU 11 decides that there is no response (step S325: NO), the CPU 11 continues the process at step S325.

When the update information request is sent from the terminal unit 10 at step S324, the CPU 31 of the connection control unit 30 decides at step S322 that there is a response (step S322: YES), receives the update information request sent from the terminal unit 10 (step S326), and searches the update information database 354 based on the update number for each keyword included in the received update information request (step S327) to determine whether update information indicated by the update number is stored (step S328). When the update information indicated by the update number is stored (step S328: YES), the CPU 31 of the connection control unit 30 sends the update information to the terminal unit 10 (step S329).

When the CPU 31 decides that there is no update information indicated by the update number (step S328: NO), the CPU 31 searches the connection-condition information database 351 to retrieve the URL corresponding to the update number, and sends an HTTP request based on the retrieved URL to acquire update information from a predetermined server of the opened network NW2 (step S330). The connection control unit 30 stores the acquired update information in the update information database 354 (step S331), sends the stored update information to the terminal unit 10 (step S332), and continues the process at step S303.

When the update information is sent from the connection control unit 30 at step S329 or step S332, the CPU 11 of the terminal unit 10 decides that there is a response at step S325 (step S325: YES), and receives the update information sent from the connection control unit 30 (step S333). The CPU 11 of the terminal unit 10 updates the connection history information recorded in the recording means 13 based on the received update information (step S334), and continues the process at step S301.

Through the above-described procedures, the connection control unit 30 can determine whether the security level of the terminal unit 10 reaches a given level based on whether or not the connection history information fulfills the connection condition information, and can improve the security level of the terminal unit 10 by updating the connection history information based on the update information when the connection history information does not fulfill the connection condition information of the terminal unit 10.

The system may take a structure such that the process of acquiring the connection history information of the terminal unit 10 by the connection-history-information acquisition program in the sequence of steps S304 to S307 is carried out only at the time of the initial access to the terminal unit 10, and at the time of the second access or the subsequent accesses, the connection history information is appended to the connection request at step S301 using a cookie technique of appending information to the HTTP header, then the connection request is sent to the connection control unit 30.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An opened network connection control method, for connecting to an opened network from a closed network, the closed network comprising:
   terminal units connected to one another in such a way as to be able to exchange data with one another;
   a central unit which receives a connection request to the opened network from each of the terminal units, and controls connection to the opened network; and
   a connection control unit which receives an assignment request for a virtual logic identifier from the central unit and assigns the virtual logic identifier to each of the terminal units, the connection control method comprising:
   storing connection condition information having a keyword indicating an item necessary for ensuring a security level of the terminal unit from which the connection request is received and an update number indicating a process for updating the item;
   receiving an assignment request from the central unit;
   acquiring connection history information having the keyword indicating the item installed in each terminal unit and the update number indicating the process which was applied to each terminal unit which corresponds to the assignment request to the opened network;
   determining whether the acquired connection history information fulfills the connection condition information or not by comparing the update number in the connection history information and the update number in the connection condition information with respect to the keyword; and assigning the virtual logic identifier to the terminal unit corresponding to the assignment request when it is determined that the acquired connection history information fulfills the connection condition information.

2. The opened network connection control method according to claim 1, wherein
the method further comprises accepting alteration of the connection condition information.

3. The opened network connection control method according to claim 1, wherein the method further comprises acquiring the connection history information from the terminal unit which corresponds to the assignment request.

4. The opened network connection control method according to claim 1, wherein
the method further comprises sending information on an item of the connection condition information which is not fulfilled by the connection history information to the terminal unit corresponding to the assignment request in case that it is determined that the acquired connection history information does not fulfill the connection condition information,
receiving information on the item of the connection condition information which is not fulfilled,
updating the connection history information according to the information on the item of the connection condition information which is not fulfilled, and
storing the updated connection history information.

5. The opened network connection control method according to claim 1, wherein
the method further comprises
acquiring the connection history information of the terminal unit and storing the acquired connection history information.

6. The opened network connection control method according to claim 2, wherein
the method further comprises acquiring the connection history information from the terminal unit which corresponds to the assignment request.

7. The opened network connection control method according to claim 2, wherein
the method further comprises
sending information on the item of the connection condition information which is not fulfilled by the connection history information to the terminal unit corresponding to the assignment request in case that it is determined that the acquired connection history information does not fulfill the connection condition information,
receiving information on the item of the connection condition information which is not fulfilled,
updating the connection history information according to the information on the item of the connection condition information which is not fulfilled, and
storing the updated connection history information.

8. The opened network connection control method according to claim 2, wherein
the method further comprises
acquiring the connection history information of the terminal unit and storing the acquired connection history information.

9. An opened network connection control system comprising:
terminal units;
a central unit which receives a connection request to the opened network from each of the terminal units, and controls connection to the opened network; and
a connection control unit which receives an assignment request for a virtual logic identifier from the central unit and assigns the virtual logic identifier to each of the terminal units,
wherein the terminal units are connected, and the connection control unit
comprises a processor capable of performing the following operations of:
storing connection condition information having a keyword indicating an item necessary for ensuring a security level of the terminal units from which the connection request is received and an update number indicating a process for updating the item;
receiving an assignment request from the central unit;
acquiring connection history information having the keyword indicating the item installed in each terminal unit and the update number indicating the process which was applied to the item by each terminal unit which corresponds to the assignment request to the opened network;
determining whether the acquired connection history information fulfills the connection condition information or not by comparing the update number in the connection history information and the update number in the connection condition information with respect to the keyword; and
assigning the virtual logic identifier to the terminal unit corresponding to the assignment request in case that it is determined that the acquired connection history information fulfills the connection condition information.

10. The opened network connection control system according to claim 9, wherein
said processor alters the connection condition information.

11. The opened network connection control system according to claim 9, wherein
said processor acquires the connection history information from the terminal unit which corresponds to the assignment request.

12. The opened network connection control system according to claim 9, wherein said processor further performs the operation of sending information on an item of the connection condition information which is not fulfilled by the connection history information to the terminal unit corresponding to the assignment request in case that it is determined that the acquired connection history information does not fulfill the connection condition information, and each of the terminal units comprises a processor performing the operations of:
receiving information on the item of the connection condition information which is not fulfilled, updating the connection history information according to the information on the item of the connection condition information which is not fulfilled, and storing the updated connection history information.

13. The opened network connection control system according to claim 9, wherein said processor further performs the operation of acquiring the connection history information of the terminal unit and stores the acquired connection history information.

14. An opened network connection control system comprising:
terminal units;
a central unit which receives a connection request to the opened network from each of the terminal units, and controls connection to the opened network; and
a connection control unit which receives an assignment request for a virtual logic identifier from the central unit and assigns the virtual logic identifier to each of the terminal units, wherein the connection control unit to be used in a closed network environment where the terminal units are connected to one another in such a way as to be able to exchange data with one another comprises:
    means for previously storing connection condition information having a keyword indicating an item necessary for ensuring a security level of the terminal units from which the connection request is received and an update number indicating a process for updating the item;
    means for receiving an assignment request from the central unit;
    means for acquiring connection history information having the keyword indicating the item installed in each terminal unit and the update number indicating the process which was applied to each terminal unit which corresponds to the assignment request to the opened network;
    means for determining whether the acquired connection history information fulfills the connection condition information or not by comparing the update number in the connection history information and the update number in the connection condition information with respect to the keyword; and
    means for assigning the virtual logic identifier to the terminal unit corresponding to the assignment request when it is determined that the connection history information fulfills the connection condition information.

15. The opened network connection control system according to claim 14, wherein
    the connection control unit further comprises means for accepting alteration of the connection condition information.

16. The opened network connection control system according to claim 14, wherein
    the connection control unit further comprises means for acquiring the connection history information from the terminal unit which corresponds to the assignment request.

17. The opened network connection control system according to claim 14, wherein
    the connection control unit further comprises means for sending information on an item of the connection condition information which is not fulfilled by the connection history information to the terminal unit corresponding to the assignment request when it is determined that the connection history information does not fulfill the connection condition information, and
    each of the terminal units further comprises:
    means for receiving information on the item of the connection condition information which is not fulfilled,
    means for updating the connection history information according to the information on the item of the connection condition information which is not fulfilled, and
    means for storing the updated connection history information.

18. The opened network connection control system according to claim 14, wherein
    the connection control unit further comprises means for acquiring the connection history information of the terminal unit and storing the acquired connection history information.

19. A connection control unit, which receives a connection request to the opened network from a terminal unit, and receives an assignment request for a virtual logic identifier from a central unit which controls connection to the opened network, and assigns the virtual logic identifier to the terminal unit, wherein the connection control unit comprises a processor performing the following operations of:
    storing connection condition information having a keyword indicating an item necessary for ensuring a security level of the terminal unit from which the connection request is received and an update number indicating a process for updating the item;
    receiving an assignment request from the central unit;
    acquiring connection history information having the keyword indicating the item installed in each terminal unit, the update number indicating the process which was applied to the terminal unit which corresponds to the assignment request to the opened network;
    determining whether the acquired connection history information fulfills the connection condition information or not by comparing the update number in the connection history information and the update number in the connection condition information with respect to the keyword; and
    assigning the virtual logic identifier to the terminal unit corresponding to the assignment request when it is determined that the connection history information fulfills the connection condition information.

20. The connection control unit according to claim 19, wherein said processor alters the connection condition information.

21. The connection control unit according to claim 19, wherein said processor acquires the connection history information from the terminal unit which corresponds to the assignment request.

22. The connection control unit according to claim 19, wherein
    when it is determined that the acquired connection history information does not fulfill the connection condition information, an item of the connection condition information which is not fulfilled is output to a terminal unit.

23. The connection control unit according to claim 19, wherein said processor
    acquires the connection history information of the terminal unit and storing the acquired connection history information.

24. A connection control unit, which receives a connection request to an opened network from a terminal unit, and receives an assignment request for a virtual logic identifier from a central unit which controls connection to the opened network, and assigns the virtual logic identifier to the terminal unit, wherein the connection control unit comprises:
    means for storing connection condition information having a keyword indicating an item necessary for ensuring a security level of the terminal unit from which the connection request is received and an update number indicating a process for updating the item;
    means for receiving an assignment request from the central unit;
    means for acquiring connection history information, having the keyword indicating the item installed in each terminal unit and the update number indicating the process was applied to the terminal unit which corresponds to the assignment request to the opened network;
    means for determining whether the acquired connection history information fulfills the connection condition information or not by comparing the update number in the connection history information and the update number in the connection condition information with respect to the keyword; and
    means for assigning the virtual logic identifier to the terminal unit corresponding to the assignment request when it is determined that the connection history information fulfills the connection condition information.

25. The connection control unit according to claim 24, further comprising
    means for accepting alteration of the connection condition information.

26. The connection control unit according to claim 24, further comprising
means for acquiring the connection history information from the terminal unit which corresponds to the assignment request.

27. The connection control unit according to claim 24, further comprising
means for outputting an item of the connection condition information which is not fulfilled by the connection history information to a terminal unit when it is determined that the connection history information does not fulfill the connection condition information.

28. The connection control unit according to claim 24, further comprising
means for acquiring the connection history information of the terminal unit and storing the acquired connection history information.

29. A non-transitory computer-readable medium storing a computer program for causing a computer to receive a connection request to the opened network from a terminal unit, to receive an assignment request for a virtual logic identifier from a central unit which controls connection to the opened network, and to assign the virtual logic identifier to the terminal unit, wherein the connection control unit previously stores connection condition information having a keyword indicating an item necessary for ensuring a security level of the terminal unit from which the connection request is received and an update number indicating a process for updating the item, and the computer program which when executed causes the computer to perform: receiving an assignment request from the central unit, acquiring connection history information having the keyword indicating the item installed in each terminal unit and the update number indicating the process which was applied to the terminal unit which corresponds to the assignment request to the opened network, determining whether the acquired connection history information fulfills the connection condition information or not by comparing the update number in the connection history information and the update number in the connection condition information with respect to the keyword; and assigning the virtual logic identifier to the terminal unit corresponding to the assignment request in case that it is determined that the acquired connection history information fulfills the connection condition information.

30. The non-transitory computer-readable medium according to claim 29, further comprising accepting alteration of the connection condition information.

31. The non-transitory computer-readable medium according to claim 29, further comprising acquiring the connection history information from the terminal unit which corresponds to the assignment request.

32. The non-transitory computer-readable medium according to claim 29, further comprising outputting an item of the connection condition information which is not fulfilled by the connection history information to a terminal unit in case that it is determined that the connection history information does not fulfill the connection condition information.

33. The non-transitory computer-readable medium according to claim 29, further comprising acquiring the connection history information of the terminal unit and storing the acquired connection history information.

34. A network connection method comprising:
receiving a connection request indicating a request to assign of a network resource which is necessary to communicate with an apparatus connected to the network, from a terminal apparatus;
acquiring, in response to having received the connection request, history information having information indicating a process which was applied to the terminal apparatus, necessary for ensuring a security level of the terminal apparatus;
retrieving, in response to having received the connection request, connection condition information having information necessary for ensuring the security level of the terminal apparatus;
determining, in response to having received the connection request, whether the acquired history information fulfills the connection condition information or not;
assigning, in response to having received the connection request, the network resource to the terminal apparatus corresponding to the connection request, if it is determined that the acquired history information fulfills the connection condition information; and
transmitting, in response to having received the connection request, update information necessary for satisfying condition information to the terminal apparatus, if it is determined that the acquired history information does not fulfill the connection condition information.

35. A network connection control apparatus comprising:
a receiving unit which receives a connection request indicating a request to assign of a network resource which is necessary to communicate with an apparatus connected to the network, from a terminal apparatus;
an acquiring unit which acquires, in response to having received the connection request, history information having information indicating a process which was applied to the terminal apparatus, necessary for ensuring a security level of the network connection control apparatus;
a retrieving unit which retrieves, in response to having received the connection request, connection condition information necessary for ensuring the security level;
a determining unit which determines, in response to having received the connection request, whether the acquired history information fulfills the connection condition information or not;
an assigning unit which assigns, in response to having received the connection request, the network resource to the terminal apparatus corresponding to the connection request, if it is determined that the acquired history information fulfills the connection condition information; and
a transmitting unit which transmits, in response to having received the connection request, update information necessary for satisfying condition information to the terminal apparatus, if it is determined that the acquired history information does not fulfill the connection condition information.

* * * * *